(12) United States Patent
Sklyarevich

(10) Patent No.: US 6,368,994 B1
(45) Date of Patent: Apr. 9, 2002

(54) RAPID PROCESSING OF ORGANIC MATERIALS USING SHORT WAVELENGTH MICROWAVE RADIATION

(75) Inventor: Vladislav E. Sklyarevich, Feasterville, PA (US)

(73) Assignee: Gyrorron Technology, Inc., Bristol, PA (US)

( * ) Notice: Subject to any disclaimer, the term of this patent is extended or adjusted under 35 U.S.C. 154(b) by 0 days.

(21) Appl. No.: 09/472,855

(22) Filed: Dec. 27, 1999

(51) Int. Cl.[7] .......................... B01J 37/34; B01J 21/00; B01J 23/00; B01J 27/22; C08J 3/28; C08F 2/50; C08K 3/08; C08K 3/14; C08K 3/34; C08K 3/28

(52) U.S. Cl. .......................... 502/5; 502/202; 502/216; 502/232; 502/300; 522/1; 522/24; 522/29; 522/30; 522/60; 522/66; 522/68; 522/71; 522/74; 522/77; 522/79; 522/81; 522/83; 522/107; 522/182

(58) Field of Search .......................... 502/5, 202, 216, 502/232, 300; 522/1, 24, 29, 30, 60, 66, 68, 71, 74, 77, 79, 81, 83, 107, 182

(56) References Cited

U.S. PATENT DOCUMENTS

| | | | |
|---|---|---|---|
| 4,011,197 A | | 3/1977 | Lee .......................... 260/46.5 |
| 4,026,844 A | * | 5/1977 | Kittle et al. |
| RE29,590 E | | 3/1978 | Whelan ........................ 250/493 |
| 4,100,311 A | | 7/1978 | Nablo et al. .................. 427/44 |
| 4,414,339 A | * | 11/1983 | Solc et al. |
| 4,626,642 A | | 12/1986 | Wang et al. .............. 219/10.55 |
| 4,690,957 A | | 9/1987 | Fujioka et al. ................. 522/31 |
| 5,041,466 A | * | 8/1991 | Takahashi et al. |
| 5,189,078 A | | 2/1993 | Johnson et al. .............. 523/137 |
| 5,264,515 A | * | 11/1993 | Cody et al. |
| 5,296,271 A | | 3/1994 | Swirbel et al. ............. 427/493 |
| 5,317,045 A | | 5/1994 | Clark, Jr. et al. ........... 523/300 |
| 5,391,595 A | | 2/1995 | Clark, Jr. et al. ........... 523/300 |
| 5,396,249 A | | 3/1995 | Yamada et al. ................. 342/1 |
| 5,574,077 A | * | 11/1996 | Dougherty et al. |
| 5,576,358 A | * | 11/1996 | Lem et al. |
| 5,650,477 A | * | 7/1997 | Parodi et al. |
| 5,721,286 A | | 2/1998 | Lauf et al. ....................... 522/1 |
| 5,798,395 A | * | 8/1998 | Lauf et al. |
| 5,833,795 A | | 11/1998 | Smith et al. ............. 156/272.4 |
| 5,863,963 A | | 1/1999 | Narang et al. .............. 522/162 |
| 5,879,756 A | | 3/1999 | Fathi et al. .................. 427/487 |
| 5,911,940 A | | 6/1999 | Walton et al. .............. 264/415 |
| 5,942,559 A | | 8/1999 | Voser et al. ................. 523/115 |
| 6,103,812 A | * | 8/2000 | Wei et al. |
| 6,133,398 A | * | 10/2000 | Bhat et al. |

FOREIGN PATENT DOCUMENTS

JP 402261626 4/1989

OTHER PUBLICATIONS

"Materials Processing Using A Variable Frequency Microwave Furnace", the American ceramic Society, Apr. 1993, pp. 571–579. No copy.

* cited by examiner

Primary Examiner—Susan W. Berman
(74) Attorney, Agent, or Firm—Morgan & Finnegan, LLP

(57) ABSTRACT

A method for rapid polymerization, curing or a combination thereof of a polymerizable or curable composition to yield polymers and composites based on these polymers through the utilization of short wavelength microwave energy is described. The inventive method is generally applicable to the chemical transformation of any organic material that can be processed by heating. This invention also relates to specially prepared particulate polymerization curing materials which, when dispersed and irradiated in a polymerizable or curable composition, will effect rapid polymerization, curing or a combination of polymerization and curing of that composition without exceeding the decomposition temperature of the polymerizable or curable composition when the composition is exposed to microwave radiation. The polymerization agent may also be encapsulated by a material which coats the polymerization agent to prevent its premature release into the polymerizable or curable composition.

29 Claims, 6 Drawing Sheets

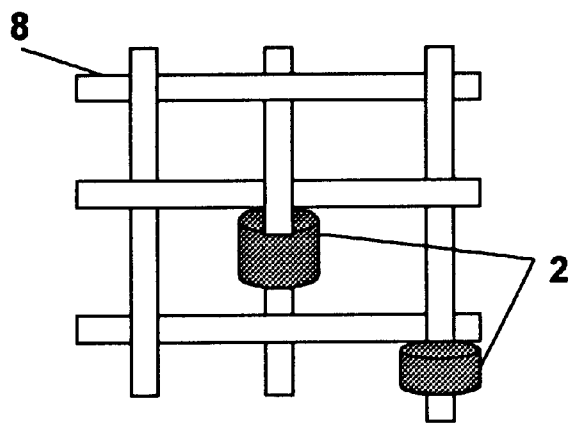
Figure 6 a
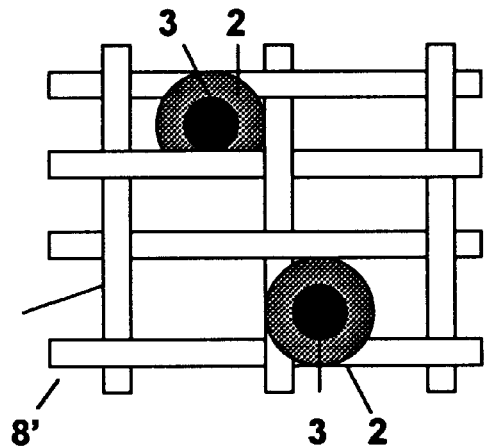
Figure 6, b
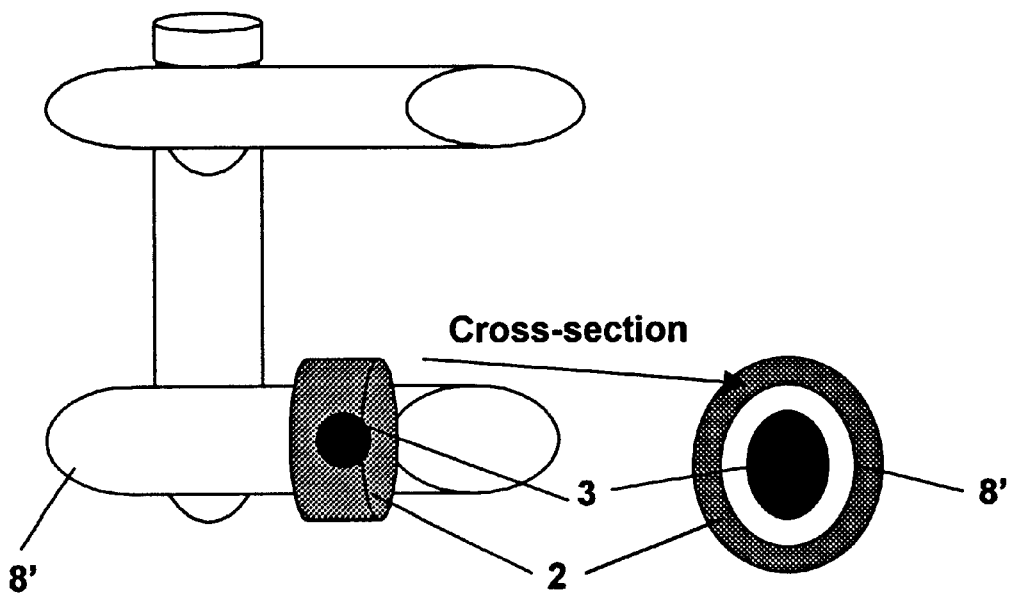
Figure 6, c

RAPID PROCESSING OF ORGANIC MATERIALS USING SHORT WAVELENGTH MICROWAVE RADIATION

BACKGROUND OF THE INVENTION

There are two main delays encountered in the polymerization or cross-linking (curing) of organic materials. First, the conduction of heat in these materials is slow because most organic materials including organic monomers, oligomers and polymers exhibit low thermal conductivity. As a result, dozens of minutes are needed for the volumetric heating of an organic material thickness of even a few inches. Second, the rate of the polymerization and cross-linking reactions cannot be increased by simply increasing the temperature of the organic material because the temperature of the composition must be kept relatively low to avoid burning of the material from the heat which is liberated by the chemical reaction.

The most common methods for polymerization or curing of organic compositions employ chemical agents such as polymerization initiators or curing agents, which induce polymerization of monomers and curing of polymers. These agents are also capable of inducing the combined polymerization and curing of multi-functional monomers such as trimethylolpropane triacrylate.

In practice, very rapid polymerization or curing of organic materials can be achieved even at room temperature by employing "super-active" resins and/or polymerization agents. However, such "super-active" materials cannot be used in industrial processing because the pot lifes of the "super-active" compositions (e.g. cyanoacrylate-based glues) are extremely short resulting in a complete cure of the composition at room temperature before the material can be processed.

For industrial processing, pot life problems are typically avoided by using organic compositions in which the temperature at which polymerization or curing occurs is above room temperature, e.g. 60° C. However, polymerization and/or curing of these organic materials is typically slow because of the low thermal conductivities of these organic compositions. Consequently, as set forth above, polymerizing or curing anything but a thin layer of the organic material will require a prohibitively long processing time.

In principle, the polymerization or curing of the organic material can be accelerated by increasing the temperature at which the material is processed. However, since the polymerization or curing reaction itself will liberate heat as the reaction proceeds, this additional heat must be factored in when determining the maximum temperature to be used to accelerate the polymerization and/or curing process in order to avoid heating the system to the decomposition temperature of the organic composition. For example, if the decomposition temperature of the organic material is 140° C. and the heat generated by the polymerization or curing reaction will raise the temperature of the organic material by 50° C., the organic composition cannot be heated to greater than 90° C. to accelerate the rate of reaction. Exceeding the decomposition temperature of the organic composition is deleterious because it can lead to local or more general "hot spots" causing partial or full decomposition of the mixture. Even partial decomposition of the starting composition is undesirable because degradation products will affect the quality of the final product.

One approach to the accelerated polymerization or curing of a polymerizable or curable composition without excessive heating of the organic composition utilizes so-called cold-curing methodologies such as electron-beam (U.S. Pat. No. 4,100,311), X-ray (U.S. Pat. Nos. 5,863,963; 5,911,940), ultra-violet (U.S. Pat. No. RE29,590, U.S. Pat. No. 4,690,957), visible light (U.S. Pat. No. 5,942,559) irradiation and the like in which the radiation source induces polymerization or curing of the organic composition by reacting with the organic material to be processed to initiate a chemical reaction (e.g., direct cleavage of a C—C double bond) without significantly heating the material. However, radiation induced rapid polymerization, curing or a combination thereof require a relatively long time to effect the desired chemical transformation and can be applied only to limited organic materials and thicknesses thereof (i.e., thin layers). In addition, radiation techniques for rapid polymerization, curing or a combination thereof, e.g., X-ray and electron beam irradiation, require the use of expensive, complex and hazardous equipment.

Microwave energy has been investigated in a variety of manufacturing operations as an alternate to traditional heating methods to reduce the polymerization time of monomers and the curing time of polymers or a combination thereof. Microwave processing of monomeric and polymeric compositions is believed to be advantageous. First of all, it allows volumetric or whole-volume heating of most organic materials. Secondly, volumetric deposition of microwave energy is more efficient than the conduction from the surface achieved with conventional heating, i.e. infrared irradiation techniques. See, for example, Lauf et al., "Materials Processing Using A Variable Frequency Microwave Furnace", the American Ceramic Society, April 1993, pp. 571–79. See also, U.S. Pat. No. 5,296,271 to Swirbel et al., which proposes a method of curing photoreactive polymers by exposing them to microwave energy.

The efficiency of using microwave processing methods in an organic composition can be improved by increasing the absorption properties of the composition to microwave radiation. These microwave absorption methodologies have variously utilized admixing (adding) ferromagnetic materials (U.S. Pat. Nos. 5,391,595; 5,317,045) or electrically conductive materials (U.S. Pat. No. 4,626,642) into the composition to increase the efficiency of heating the organic composition or have selected an optimal frequency where polymer absorption properties are highest (U.S. Pat. No. 4,011,197). These methods reduce the curing time due to volumetric fast heating despite the low thermal conductivity of most polymer compositions (U.S. Pat. Nos. 5,396,249; 5,879,756). All of these patents are hereby incorporated by reference in their entirety. Nevertheless, despite the advantages of these methodologies, short volumetric reaction times (seconds) were still not achievable because in these methods, all parts of the composition are heated to the same temperature and therefore there is a practical limit to the polymerization agent temperature as noted above.

Consequently, achieving very short curing times throughout the organic material to be processed while avoiding organic degradation remains a significant challenge in the polymer processing industry. Clearly, there exists a need for a treatment method which can ensure high speed production of cured, thermosetting polymer based items. A need also exists for the rapid polymerization of thermally sensitive monomers to produce thermoplastic materials (which may optionally be further converted to thermosetting materials) without significant thermal degradation of the starting monomer or the partially polymerized composition.

Finally, a need exists for a high-speed curing or polymerization process which allows the manufacturing cost of polymer-based products to be competitive with that of metallic products. The main advantages of high speed polymerization and curing of organic materials are increased production rate and reduced manufacturing costs. Many other specific advantages also exist including but not limited to the elimination of huge furnaces in plastic, prepregs and composite production, shorter die lengths for pultrusion, the possibility of layer-by-layer curing in winding and the use of high temperature curing agents that increase shelf and pot life.

SUMMARY OF THE INVENTION

This invention relates to a method for rapid polymerization, curing or a combination thereof of a polymerizable or curable composition to yield polymers and composites based on these polymers through the utilization of short wavelength microwave energy. This invention also relates to specially prepared particulate polymerization curing materials which, when dispersed and irradiated in a polymerizable or curable composition, will effect rapid polymerization, curing or a combination of polymerization and curing of that composition without exceeding the decomposition temperature of the polymerizable or curable composition when the composition is exposed to microwave radiation. The inventive method is particularly suitable for the rapid polymerization, curing or a combination thereof of monomers, curable polymers and composites.

The particulate polymerization curing material of the invention comprises a polymerization agent applied on a microwave absorbent carrier. In the inventive method, the particulate polymerization curing material is admixed or dispersed into a polymerizable or curable composition and microwave energy applied thereto to initiate polymerization, curing or a combination thereof of the mixture.

In one embodiment of the invention, the particulate polymerization curing material comprises a polymerization agent which is soluble in the polymerizable or curable composition at a temperature lower than that at which the composition is polymerized or cured. In this case, the particulate polymerization curing material is encapsulated by a material which coats the polymerization agent to prevent its premature release into the polymerizable or curable composition. The encapsulating material is chosen so that the polymerization agent will be released into the composition at a temperature close to the temperature at which the composition is polymerized, cured or a combination thereof.

In an alternative embodiment of the inventive method, an uncoated microwave absorbent carrier (i.e. a carrier without a polymerization agent applied thereon) is dispersed in an organic composition processible by heat and the composition irradiated with microwave radiation to effect rapid chemical reaction of the composition without exceeding the decomposition temperature of the organic composition. The organic composition may also contain a catalyst to facilitate the chemical reaction or the microwave absorbent carrier itself may function as a catalyst.

Use of the inventive method facilitates the high speed polymerization, curing or a combination thereof of monomers, oligomers and curable polymers in seconds. The inventive method may be used in such processes as pultrusion, filament winding, coatings and the like to produce plastic materials, composites, prepregs, processing adhesives and the like. The inventive method is particularly suitable for the production of any polymer based materials which are currently produced using thermal methods.

BRIEF DESCRIPTION OF THE DRAWINGS

FIG. 6a, FIG. 6b, and FIG. 6c illustrate different embodiments of the invention which incorporate a filler.

DETAILED DESCRIPTION OF THE INVENTION

The inventive method is generally applicable to the chemical reaction or transformation of any organic composition which is processible by controlled heating. These chemical reactions or transformations include but are not limited to the curing of polymer or resin compositions, polymerization of monomer compositions and the polymerization and curing of multi-functional monomer compositions. Controlled heating maintains a temperature differential between the particulate polymerization curing material or the uncoated microwave absorbent carrier and the organic composition (as opposed to the heating of the entire organic composition).

The inventive method is described in detail below for those embodiments which utilize a particulate polymerization curing material but is understood to include any chemical transformation of an organic composition which can be effected by the controlled application of heat to the composition by microwave irradiation wherein a temperature differential is maintained between an uncoated microwave absorbent carrier (i.e., a carrier to which no polymerization agent has been applied) and the organic composition. The necessary temperature differential in the alternative embodiment of the inventive method is obtained by the appropriate selection of carrier, carrier size and dispersion, microwave power density and frequency and exposure time as described for the other embodiments of the invention.

For purposes of this invention, the term "polymerization agent" includes components which are added to a polymerizable or curable composition to induce polymerization or curing or a combination thereof of the composition. Thus, the term "polymerization agent" is intended to be inclusive of materials that act as curing or cross-linking agents, initiators, accelerators, promoters, catalysts and the like. The term "resin" is also defined to include organic monomers, oligomers, polymers, multi-functional monomers and other organic materials which can be processed using heat and catalysts.

The inventive method is described in detail below for the embodiment of the invention in which a polymer composition is cured. However, it is understood that the description is applicable to the alternative embodiments of the invention.

Curing of a Polymer Composition

Figure 1:
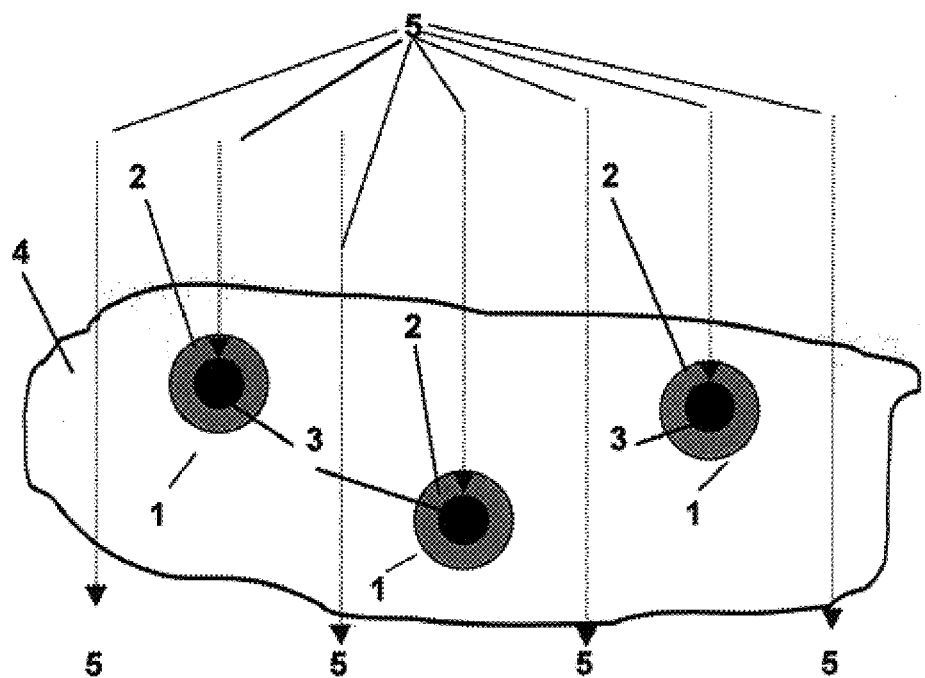
FIG. 1 illustrates the dispersion of the particulate polymerization curing material in the organic composition to be processed.

A method of treating a composition comprising at least one polymer to effect further and rapid chemical reaction (e.g., curing) of the polymer is described. In the inventive method and as illustrated in FIG. 1, a particulate polymerization curing material 1 comprising a polymerization agent 2 applied on a particulate microwave absorbent carrier 3 is dispersed in the organic composition 4 to be treated.

The particulate polymerization curing material 1 can be prepared by any method which applies a coating of the polymerization agent 2 to the microwave absorbent carrier 3. These methods include but are not limited to 1.) submerging the microwave absorbent carrier powder into the liquid polymerization agent or a solution thereof; 2.) spraying the polymerization agent onto the microwave absorbent carrier and 3.) chemical deposition (i.e., CVD) of the polymerization agent onto the microwave absorbent carrier. In a preferred embodiment, a microwave absorbent carrier with a high surface area such as an adsorbent is used as a carrier. In this embodiment, the irregular, creviced surface of the carrier allows a maximal amount of polymerization agent to be applied to the carrier.

The microwave absorbent carrier 3 has higher absorption properties for the applied microwave radiation 5 than any other part of the organic composition 4 such as the polymer or polymers, partially cured polymer, polymerization agent or filler. The microwave radiation 5 is selectively absorbed by the microwave absorbent carrier 3 which rapidly heats the polymerization agent 2 applied thereto by thermal conduction.

The mixture is exposed to microwave radiation 5 at a power density and exposure time for a time less than about $n^{-2/3}\eta^{-1}$ (as explained below where n is the dispersion of the microwave absorbent carrier and η is the temperature conductivity of the polymer composition) but sufficient to achieve the activation energy of the polymerization agent. In addition, the microwave frequency, power density and exposure time, as well as the size and dispersion of the microwave absorbent carrier is selected to ensure that the polymerization agent is heated to a temperature higher than the composition temperature such that the difference between the two temperatures is large enough to prevent the temperature of the composition from exceeding its decomposition temperature after the composition has been additionally heated by the heat generated by the chemical reaction. Thus, the polymerization agent is heated to a sufficiently high temperature that rapidly effects further chemical reaction of the polymer composition (e.g. curing) without significantly raising the temperature of the curable composition being treated by exposure to microwave radiation.

The temperature of the mixture of particulate polymerization curing material and organic composition can be further controlled by externally cooling the mixture prior to or during microwave irradiation. Cooling methods include but are not limited to 1.) placing the receptacle containing the mixture onto a cooled plate or into a cooled vessel; 2.) applying forced gas cooling to the sample chamber and 3.) immersion cooling.

In general, for each given polymer composition the higher the temperature of the system, the shorter the curing time, i.e., the activation temperature of the polymerization agent (which in this case is a curing agent) determines the curing time. Thus, to achieve a higher curing speed for any given composition, it is necessary to raise the temperature of the polymerization agent.

Different polymerization agents can have different useful activation or initiator temperature ranges, as discussed, for example in H. R. Allcock et al., *Contemporary Polymer Chemistry*, 1981, pp. 55–59, which is hereby incorporated by reference.

In most polymer compositions, the curing process itself releases additional heat which also adds to the heat applied to the polymer composition. As a result, the decomposition temperature of the polymer composition can easily be reached resulting in partial or complete degradation of the polymer composition, deterioration of physical properties and bubbling of the final polymers. Thus, for each type of polymer composition there is a limiting curing temperature which corresponds to the enthalpy of the polymer or polymers contained therein. Therefore, there is a functional limit to the curing time.

The present invention solves this problem by exclusively and rapidly heating the polymerization agent to a significantly higher temperature than the polymer composition.

Polymerization of a Monomer Composition

In another embodiment of the inventive method (FIG. 1), polymeric thermoplastic materials, and the composites based on them, may be produced by polymerizing a monomer system comprising at least one monomer and a uniformly dispersed particulate polymerization curing material. In this embodiment of the invention, rapid polymerization of the monomer composition is initiated by selective heating of a polymerization agent 2 (in this case, a polymerization initiator, activator, catalyst or the like) which is applied on a microwave absorbent carrier 3 as described above to prepare the particulate polymerization curing material 1. As in the previous embodiment of the invention, a polymerization agent is applied on a carrier to produce a particulate polymerization curing material with the carrier having higher absorption properties for the applied microwave radiation than any other part of the monomer composition such as the monomer(s), the mixture of monomer(s), oligomer(s) and polymer, polymerization agent or filler. The particulate polymerization curing material 1 is admixed into the organic composition 4 which is then exposed to microwave radiation 5. The microwave radiation is selectively absorbed by the microwave absorbent carrier 3. The polymerization agent applied on the carrier is rapidly heated in turn by conduction heating without significantly raising the temperature of the surrounding monomer composition as described above. The polymerization agent then rapidly induces polymerization of the surrounding monomer composition.

Multifunctional Momomers

One of ordinary skill in the art will also recognize that the inventive method is also applicable to those monomer compositions in which one or more of the monomers is a multi-functional monomer, such as trimethylolpropane triacrylate. In this case, selective heating of the particulate polymerization curing material comprising a polymerization agent applied on a microwave absorbent carrier will simultaneously initiate both polymerization and curing of the monomer composition.

Controlled Thermal Processing of an Organic Composition

The inventive method is also applicable to the thermal processing of an organic composition in which an uncoated microwave absorbent carrier material is dispersed in an organic composition with the carrier having higher absorption properties for the applied microwave radiation than any other part of the organic composition. The uncoated microwave absorbent carrier 3 (i.e., the bare carrier without an applied coating of polymerization agent) is admixed into the organic composition 4 which is then exposed to microwave radiation 5. The microwave radiation is selectively absorbed by the carrier 3. The carrier is rapidly heated and, in turn, rapidly heats the portion of the organic composition immediately surrounding the carrier.

Unlike other methodologies in which microwave radiation is applied to admixed electroconductive or ferromagnetic materials to volumetrically heat the entire organic composition, in this embodiment of the inventive method the dispersion of the carrier is kept sufficiently low, the microwave power density and frequency are kept sufficiently high and the microwave irradiation or exposure time is chosen such that the bulk of the organic composition remains unheated by the irradiated carrier particles. The heat transferred to the layer of the organic composition immediately surrounding the carrier is sufficient to initiate a chemical transformation of the organic composition without significantly raising the temperature of the surrounding organic composition.

In all of the embodiments of the invention, the size of the microwave absorbent carriers, their dispersion in the composition to be treated and the frequency, power density and exposure time of the applied microwave radiation are all important parameters of the inventive method which must be determined for each organic composition processed. The process parameters are chosen such that the temperature of the polymerization agent is sufficient to effect the desired chemical transformation in the selected time while ensuring that the difference between the temperature of the polymerization agent and the composition is sufficient to prevent the temperature of the composition from rising higher than its decomposition temperature (after the composition has been additionally heated by the heat generated by the curing or polymerization process or a combination thereof.

These parameters and how they are chosen are generally described below for the embodiment of the invention in which a polymer composition is cured. However, it is understood that the same parameters and their choices are applicable to and must be considered in the alternative embodiments of the invention described above wherein a monomer composition is polymerized and a multifunctional monomer is both polymerized and cured. The same parameters are important in the alternative embodiment of the inventive method where an uncoated microwave absorbent carrier is dispersed in an organic composition.

Sizes and Dispersions of the microwave Absorbent Carriers

In the embodiments of the invention discussed above, a particulate polymerization curing material comprising a polymerization agent applied on a microwave absorbent carrier, an encapsulated particulate polymerization curing material or a microwave absorbent carrier are dispersed in the organic composition to be processed by microwave irradiation. However, in all cases, the important process parameters in the inventive method are calculated or experimentally determined based on the size and dispersion of the microwave absorbent carrier (whether coated with polymerization agent or uncoated) because the carrier is the material which absorbs the microwave radiation and because any organic material coated thereon (e.g., polymerization agent or polymerization agent and encapsulating material) has a negligible effect on the carrier's microwave absorption properties. The main criteria for the selection of these parameters are as follows:

a) the size of the microwave absorbent carrier (average diameter) should preferably be optimal for the microwave absorption frequency used;

b) the dispersion of the microwave absorbent carrier in the polymer composition should be as low as possible;

c) the size and dispersion of the microwave absorbent carrier in the polymer composition should be large enough to provide the polymer composition with the necessary amount of polymerization agent to effect substantially complete curing of the polymer composition.

Figure 2:
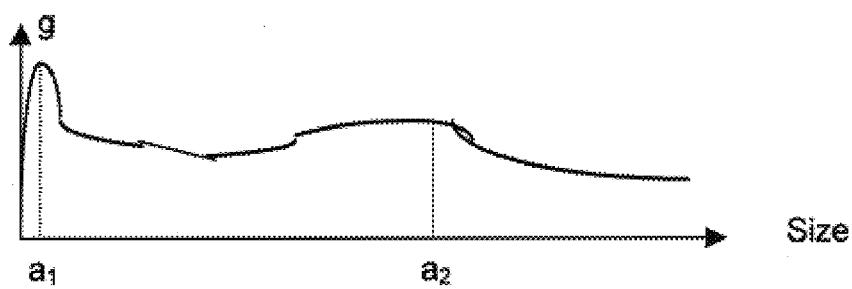
FIG. 2 graphically illustrates the dependence of a carrier particle's microwave absorption properties on its size.

FIG. 2 illustrates the dependence of the absorption properties (g) of any kind of carrier particle on it's size (See, *Electrodynamics of Continuous Media* by L. D. Landau and E. M. Lifshitz; translated from the Russian by J. B. Sykes, J. S. Bell, and M. J. Kearsley. 2nd ed., rev. and enl. by E. M. Lifshitz and L. P. Pitaevskii. *Elektrodinamika sploshnykh sred*. English Oxford [Oxfordshire]; New York: Pergamon, 1984). Maximal g is obtained when the size of the carrier particles is around the size of the skin layer ($a_1$). g decreases for carrier particle sizes near the applied microwave wavelength ($a_2$).

The skin layer is calculated as follows:

$$\delta(m)=(4\pi f \mu_o \sigma)^{-\frac{1}{2}}$$

Where $\sigma$ is the particle conductivity, f is the frequency of the applied microwave radiation, $\mu_0$ is the permeability of vacuum [($\mu_0 \approx 12.57 \times 10^{-7}$ Hm$^{-1}$ (see, for example, Handbook of Chemistry and Physics 80$^{th}$ edition, CRC Press. Section 1)]. For carbon ($\sigma \approx 10^5$ $\Omega^{-1}$m$^{-1}$ (see BP Amoco Product Brochure)), the range of optimal sizes (diameters) are from 8 micron to 30 mm if the applied microwave radiation has a frequency of 10 GHz and from 0.8 micron to 300 micron for a frequency of 1000 GHz.

During microwave irradiation, the microwave absorbent carriers accumulate energy (heat) $Q_c$ which is proportional to their weight and to their dispersion (n) wherein the dispersion is defined as the number of carrier particles per unit volume of composition This heat propagates throughout the polymer composition and proportionally increases the temperature of the polymer composition by the ratio of the total carrier weight to the total polymer composition weight. Therefore, if the carrier dispersion n is kept as low as possible, the temperature differential between the polymerization agent and polymer composition from microwave heating will be as great as possible.

The size and dispersion selected for the microwave absorbent carrier depends on the applied microwave frequency, the amount of polymerization agent needed and the carrier's microwave absorption properties. For example, if a powdered activated carbon is selected as the microwave absorbent carrier, the biggest specific material absorption (surface 900 m$^2$/g) is for a particle size around 150 micron (–100 mesh) which is designed as an adsorbent for organic removal (see Selective Adsorption Associates, Inc. Product Data.). This size particle meets the conditions as set forth above and the optimal specific material absorption determined the minimal necessary n.

Microwave Absorbent Carrier

The microwave absorbent carrier can be chosen from particles of solid organic and non-organic materials with microwave absorption properties higher than the polymer composition into which they are dispersed. The microwave absorbent carrier is chosen such that the difference in microwave absorption between the carrier and the polymer composition is maximized. In the inventive method, there is no limit on the carrier absorption rate; the higher the microwave absorption of the carrier, the better.

Preferably the microwave absorbent carrier is a semimetal or metalloid compound such as a carbide, nitride, oxide, sulfide, silicide or other material with semiconductor properties and graphite. Metal powders can be used as well. Most preferably, the microwave absorbent material is boron, carbon (in any form except diamond), silicon, SiC, $B_4C$ NbC, WC, $Al_4C$, $Ca_3N_2$, $Mg_3N_2$, VN, $P_3N_5$, ZnO, $B_2O_3$, $TiO_2$, FeO, $Fe_2O_3$, $Cr_2O_3$, $MoO_3$, $FeS_2$, $P_4S_3$, $MoS_2$, $MoSi_2$, $FeSi_2$, iron, chromium, nickel or aluminum. One of ordinary skill in the art will understand that any given microwave absorbent carrier must be compatible with the requirements of the manufactured plastic or composite as well as the method used to apply the polymerization agent to the carrier. Additional limitations may also be imposed by the polymerization agent applied to the microwave absorbent carrier (e.g., oxidizing polymerization agents cannot be used with carbon as a microwave absorbent carrier).

Maximal Possible Exposure Time

Figure 3:
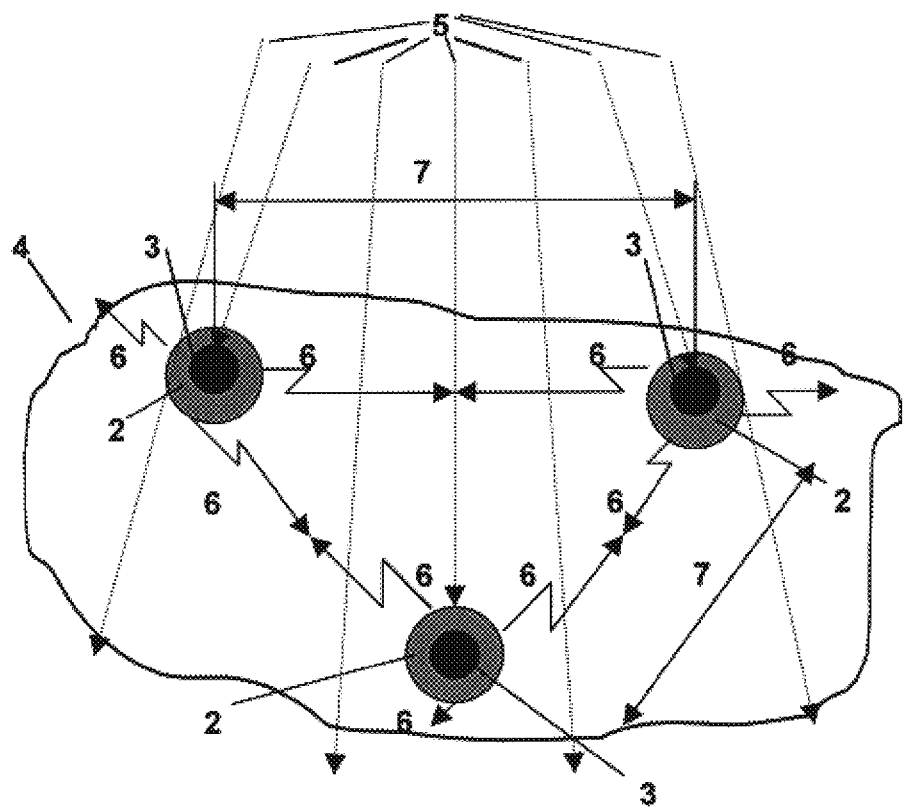
FIG. 3 schematically illustrates the processes when the particulate polymerization curing material and the organic composition are exposed to microwave radiation.

The higher microwave absorption properties of the carrier assures that the polymerization agent is heated by microwave radiation faster and to a higher temperature than the polymer composition. However, selective heating will only occur if the heating time is short enough to prevent heat transfer from the higher temperature microwave absorbent carrier to the polymerization agent applied thereon and then to the lower temperature surrounding polymer composition. When microwave absorbent carrier 3 is distributed with a dispersion (n) within the organic composition 4 as illustrated in FIG. 3 and it is the only substance heated by microwave irradiation 5, heating of the composition is only due to thermal conductivity 6 from these particles to the polymerization agent 2 and then to the polymer composition.

The average distance between particles 7 may be determined as $L=n^{-1/3}$ where n is the dispersion. It is known that the spread of heat in any material (for example, in a polymer composition) is described by a heat equation, which can be written in the following form:

$$\delta T/\delta = \eta \nabla^2 T,$$

where T is the temperature distribution of the material and $\eta = \kappa \mu / c_p \rho_c$ is the temperature conductivity of the material ($\kappa$ is the thermal conductivity coefficient of the material; $\mu$ is its formula weight; $C_p$ is its heat capacity; $\rho_c$ is its density). The values of $\kappa$ and $C_p$ can be found, for example, in the Handbook of Chemistry and Physics 80$^{th}$ edition, CRC Press LLC 1999, Section 6. The values $\rho_c$ and $\mu$ can be found in the Catalog Handbook of Fine Chemicals 1998 Sigma-Aldrich Co. If the organic composition is a blend or a mixture of one or more resins, these values are easily calculated from standard reference books.

From the above-mentioned heat equation, it is possible to estimate the time (t), which is necessary for the temperature front to pass the distance (L) between two neighboring particles which is $t \sim L^2 \eta^{-1}$. Substituting $n^{-1/3}$ instead of (L) we get $t \sim n^{-2/3} \eta^{-1}$. Thus the maximal time of heating should be less than about $n^{-2/3} \eta^{-1}$ to achieve the required difference in temperature between the microwave absorbent carrier (and the polymerization agent applied thereon) and the polymer composition.

Typical polymer temperature conductivities $\eta$ range from about $1 \times 10^{-7}$ m$^2$/sec to about $5 \times 10^{-7}$ m$^2$/sec. The dispersion of the carrier n (i.e., of size 150 micron) in the polymer composition will typically range from about $3 \times 10^9$ m$^{-3}$ to about $10^{10}$ m$^{-3}$. Thus the typical range of maximal exposure time is from 0.4 to 5 sec. However, the exposure times are not limited to this range and selection of a different range of exposure times can be calculated for a particular polymer composition and dispersion of particulate polymerization curing material as set forth above.

Frequency of the Incident Microwave Radiation

The frequency of the incident microwave radiation is another important variable in the inventive method. The particular frequency chosen should ensure the maximal difference in heating between the microwave absorbent carrier and the polymer composition and the maximal speed of carrier heating.

Figure 4:
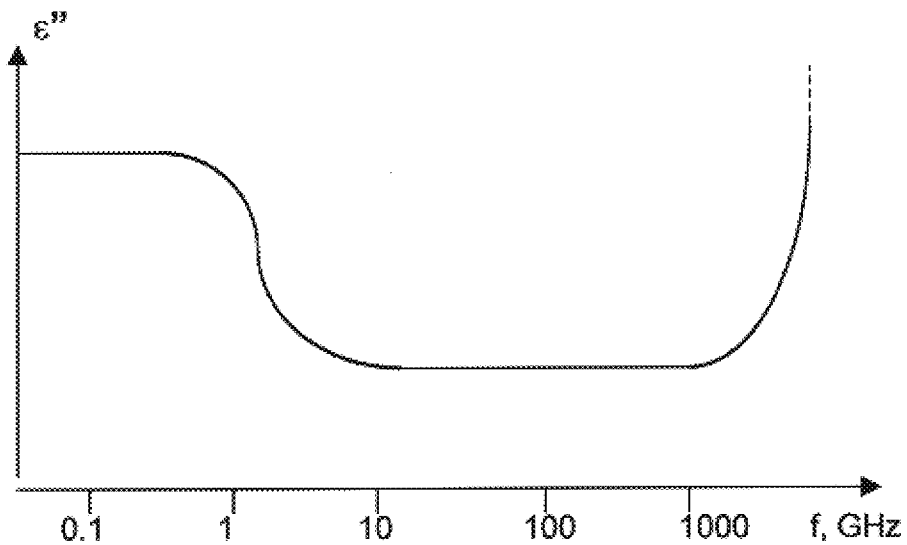
FIG. 4 graphically illustrates how the microwave absorption properties of dielectric materials like organic materials depend on frequency and illustrates the "transparent window" of an organic composition.

This criteria is best met by selecting the frequency of the incident microwave radiation within the so-called "transparent window." Almost every organic material exposed to microwave energy typically has a transparent window of microwave frequencies for which the absorption properties of the polymer composition to the microwave energy are minimal (see FIG. 4 and the Handbook of Chemistry and Physics 80$^{th}$ edition, CRC Press LLC 1999. Section 12, pp. 12–18). At the same time this frequency range is still effective (i.e., it allows the achievement of rapid heating) for most high absorption non-organic materials which can be used as carriers as outlined above in the section entitled "MICROWAVE ABSORBENT CARRIER". Using microwave radiation with a frequency within this range will help achieve the highest heating differential between the heated microwave absorbent carrier (coated with polymerization agent or uncoated) and the polymer composition.

The frequency range from about 1 GHz to about 1000 GHz is selected for the inventive method because a frequency in this range ensures the greatest difference between the heating of the microwave absorbent carrier and the polymer composition (which has a low level of microwave absorption). The frequency range lower than 10 GHz, i.e., from about 1 MHz to about 10 GHz is not preferred because in this range, the microwave absorption of the polymer composition is higher which reduces the temperature differential between the microwave absorbent carrier and the polymer composition. In the frequency range above about 1000 GHz, the microwave absorption of the polymer composition again begins to increase thereby reducing the temperature differential between the carrier and the polymer composition. The particular frequency chosen within the range from about 1 GHz to about 1000 GHz is selected to be that frequency at which the absorption properties of the polymer composition are minimal and is also dependent on the available microwave generator frequency with the required power density.

Power Density of the Incident Microwave Radiation and Exposure Time

Irradiation of the highly microwave absorbent carrier with microwave radiation having a high power density allows high speed heating of the polymerization agent. The higher the power density, the higher the temperature to which the polymerization agent can be heated (through heat transfer from the carrier) in the maximum possible exposure (heating) time. As noted previously, the inventive method allows the polymerization agent to be heated to a much higher temperature than the polymer composition leading to a shorter curing time because: i) the higher polymerization agent temperature accelerates the curing process; ii) there is "room" for an increase in polymer composition temperature arising from the heat generated by the curing process.

Figure 5:
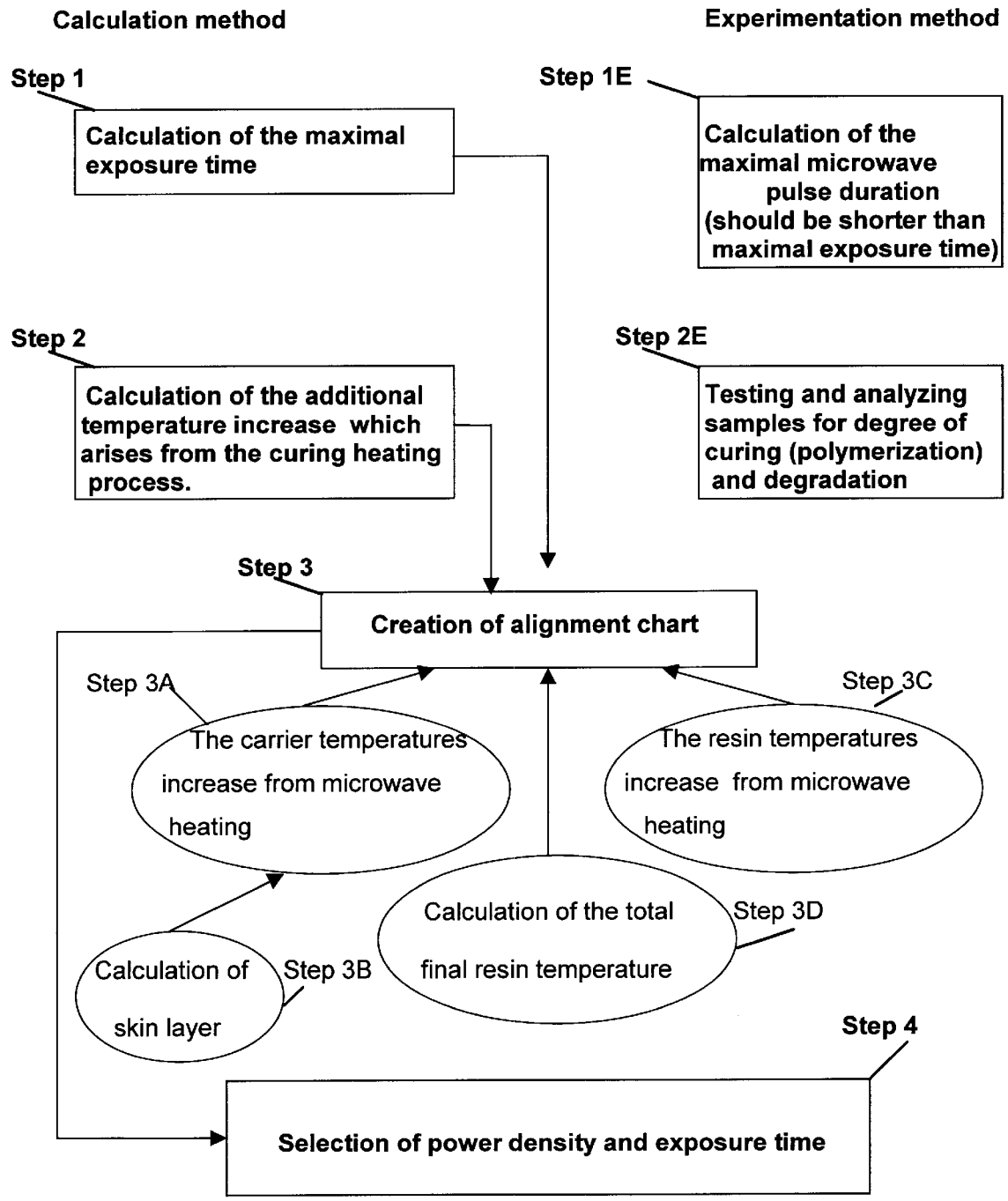
FIG. 5 illustrates in flowchart form the calculations [STEPS 1–4] or experimental measurements [STEPS 1E–2E] which can be used to select the microwave power density and exposure time in the inventive method.

The required power density is chosen to ensure that the polymerization agent (applied on the microwave absorbent carrier) is heated to the temperature necessary to achieve the requisite curing time within less than the maximal exposure time (as set forth above). FIG. 5 and the discussion below illustrates how the required power density of the incident microwave radiation can be be calculated or, in the alternative, determined through experimentation.

STEP 1: Calculation of the maximal exposure time t.

As described above, the maximum exposure time $t=n^{-2/3}\eta^{-1}$, where $\eta=\kappa\mu/c_p\rho_c$ is the temperature conductivity of the polymer composition $\kappa$ is the polymer thermal conductivity coefficient; $\mu$ is the polymer composition formula weight; $C_p$ is the polymer composition heat capacity and $\rho_c$ is the polymer composition density.

The values of $\kappa$ and $C_p$ can be found, for example, in Handbook of Chemistry and Physics 80$^{th}$ edition, CRC Press LLC 1999, Sections 6. The values $\rho_c$ and $\mu$ can be found in polymer manufacturer catalogs, for example, in the Catalog Handbook of Fine Chemicals 1998 Sigma-Aldrich Co. n is the selected carrier dispersion. If the organic composition is a blend or a mixture of one or more resins, these values are easily calculated from standard reference books.

STEP 2: Calculation of the additional temperature increase ($\Delta T_Q$) which arises from the curing heating process.

The values of all the above mentioned material properties can be found from physics handbooks or manufacturer brochures or catalogs (see, for example, Handbook of Chemistry and Physics 80$^{th}$ edition, CRC Press LLC 1999, Catalog Handbook of Fine Chemicals Sigma-Aldrich Co. 1998–99).

c) Calculate the polymer $\Delta T_c$ temperatures increasing from microwave heating (STEP 3C) during the different exposure times lower than maximal exposure time t and for various microwave power density I and for the selected (available) frequency f.

$\Delta T_c = (9\pi\gamma(\delta/a)+25\in")(It/\lambda)\mu/(C_p\rho_c)$ where $\in"$ is the complex part of the polymer dielectric permittivity for the applied microwave frequency and the other variables are as defined above. The value of $\in"$, can be found from physic handbooks (see for example Handbook of Chemistry and Physics 80$^{th}$ edition, CRC Press LLC 1999) and $\gamma$ is the concentration of the curing agent (by weight.

d) Calculation of the total final polymer temperature (STEP 3D)

$$T_{c(final)}=T_0+\Delta T_c+\Delta T_Q,$$

where $T_0$ is the initial (room) polymer temperature, $\Delta T_c$ is the additional temperature increase which arises from microwave heating and $\Delta T_Q$ is the additional temperature increase which arises from the curing heating process.

Once these values are calculated, an alignment chart as generally shown in Table I below can be created.

TABLE I

| I | $I_1$ | $I_2$ | $I_n$ | $I_{max}$ |
|---|---|---|---|---|
| T | t1 | t2 | tn | $t_{max}$ |
| $\Delta Ta$ | $\Delta Ta_1$ | $\Delta Ta_2$ | $\Delta Ta_n$ | $\Delta Ta_{max}$ |
| $\Delta Tc$ | $\Delta Tc_1$ | $\Delta Tc_2$ | $\Delta Tc_n$ | $\Delta Tc_{max}$ |
| $T_{c(final)} = T_0 + \Delta T_c + \Delta T_Q$ | $T_0 + \Delta T_{c1} + \Delta T_Q$ | $T_0 + \Delta T_{c2} + \Delta T_Q$ | $T_0 + \Delta T_{cn} + \Delta T_Q$ | $T_0 + \Delta T_{cmax} + \Delta T_Q$ |
| $T_d - T_{c(final)}$ | (+) (−) | (+) (−) | (+) (−) | (+) (−) |

Note:
$T_d$ is the polymer degradation temperature which can be found from chemistry handbooks or manufacturer brochures or catalogs.

$\Delta T_Q=Q\mu/c_p$, where Q is the polymer curing enthalpy which can be determined from the literature or can be measured by calorimetry.

STEP 3: Creation of the alignment chart for the following data requires the calculations or measurements set forth in STEPS 3A–D below:

a) Calculate the carrier $\alpha T_a$ temperature increase from the microwave heating (STEP 3A) during the different exposure times t lower than maximal exposure time tmax and for various microwave power densities I and for selected frequencies f.

$\Delta T_a=9\pi(\delta/a)(It/\lambda)(C_a^*\rho_a^*)^{-1}$, where $\delta$ is the skin-layer of the carrier material for the applied microwave frequency; a is the carrier size (radius); $\lambda$ is microwave wavelength and $\lambda=c/f$ (c is the speed of light in vacuum); $C_a^*=(C_a+\phi C_{ca})/(1+\phi)$ where $\phi$ is the ratio of applied polymerization agent weight to microwave absorbent carrier weight, $C_a$ is the carrier heat capacity and $C_{ca}$ is the polymerization agent heat capacity; $\rho_a^*=(1+\phi)\rho_a$ where $\rho_a$ is carrier density.

b. Calculate the skin layer (STEP 3B). $\delta=(4\pi f\mu_0\sigma)^{-\frac{1}{2}}$, where $\mu_0$ is the vacuum permeability and $\sigma$ is the electrical conductivity of the carrier material.

STEP 4: Selection of the power density and exposure time from the alignment chart data to meet the required polymerization agent temperature (curing time). The criteria for selection is $T_d-T_{c(final)}>0$ (i.e., the value is positive (+)) and allows the appropriate choice of power density and exposure time so that the temperature of the composition does not exceed its decomposition temperature after the composition has been additionally heated by the heat generated by the chemical reaction.

Alternatively, the appropriate parameters to assure that the decomposition temperature of the composition is not exceeded as discussed above can be selected empirically through experimentation by processing test samples of the particulate polymerization curing material by irradiation with microwave beam pulses with varying power density and assaying the appearance and properties of the resultant material. The experimental approach to selecting the process variables includes the following steps (see FIG. 5):

STEP 1E: Calculation of the maximal pulse duration which should be shorter than maximal exposure time t (see above for the calculation of t).

STEP 2E: Analysis of the test samples for the degree of curing and degradation using standard test procedures (for example,using infrared spectroscopy or differential scanning calorimetry or thermal mechanical (TMA) or gravimetric (TGA) analysis or dynamic mechanical analysis).

Fillers

Many polymer compositions include fillers or additives such as, for example inorganic or organic particulates, fibers, fiberglass, minerals, whiskers and the like. Fillers can be reinforcing or non-reinforcing. Common examples include metal oxides, glass and carbon fibers, graphite, clay, metals and the like.

If part of the filler is made from a material with higher absorption properties for microwave radiation than those of the polymer composition used, this part of the filler 8 can be coated with polymerization agent 2 which would then be activated upon microwave irradiation as illustrated in FIG. 6a. In this case, the absorbing part of the filler 8 functions as the microwave absorbent carrier and the dispersion of the filler in the composition must be kept sufficiently low to minimize heat conduction but should be large enough to provide the polymer composition with the necessary amount of polymerization agent to effect rapid and substantially complete curing of the polymer composition (see above).

As illustrated in FIG. 6b, if the filler 8' has low absorption for the microwave radiation employed (for example fiberglass), a suitable microwave absorbent carrier 3 with polymerization agent 2 applied thereon to produce a particulate polymerization curing material 1 can be distributed within the filler 8' prior to inclusion in the polymer composition or, as illustrated in FIG. 6c, microwave absorbent carriers 3 may also be distributed within filler particles 8' such as fiberglass and a polymerization agent 2 can be applied to the external surface of the filler 8'. The size and dispersion of the microwave absorbent carrier are optimized as described above.

Although FIGS. 6a–c depict a filler 8 and 8' having a mesh-like structure, it is understood that the filler can have any structure appropriate to the application such as fibers, particles, rods and the like.

Encopsulating Materials for the Particulate Polymerization Curing Material

Figure 7:
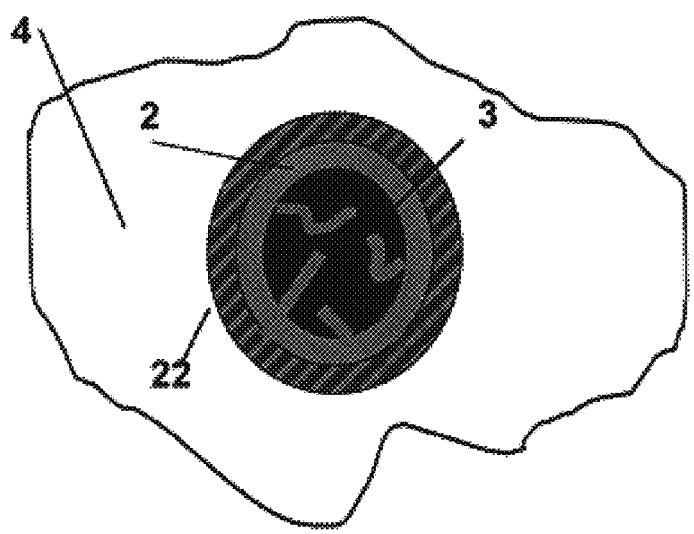
FIG. 7 schematically illustrates an alternative embodiment of the invention in which the polymerization agent applied on the microwave absorbent carrier is encapsulated with a suitable material.

As illustrated in FIG. 7, if the polymerization agent 2 applied to the microwave absorbent carrier 3 is soluble in the organic composition 4 at a temperature lower than the temperature at which the composition is polymerized, cured or a combination thereof, the polymerization agent 2 may be encapsulated by a material 22 which is insoluble in the polymer composition until a temperature in the vicinity of the activation temperature. The encapsulating material is chosen so that the polymerization agent will be released into the polymer composition at a temperature close to the temperature at which the composition is cured. Suitable encapsulating materials include paraffin, stearine, wax, thermoplastic and other materials with appropriate melting points and properties.

Composite Structures

Figure 8:
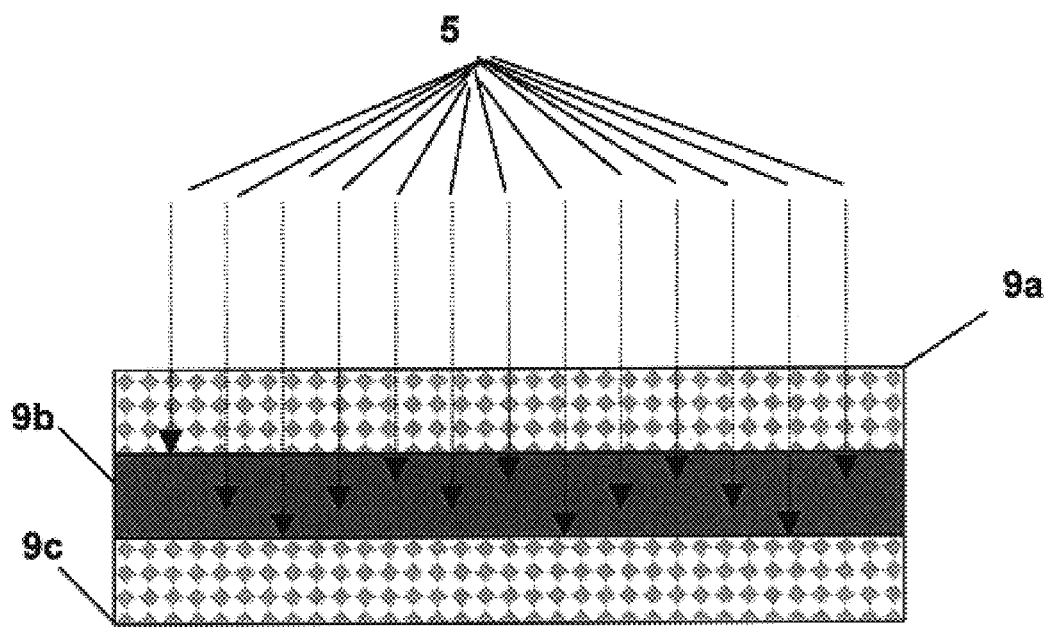
FIG. 8 schematically illustrates a composite structure prepared by the inventive method.

The inventive method is particularly suitable for the selective polymerization and/or curing of composite materials or structures in which the composition to be further chemically treated is embedded in or sandwiched between a material which is transparent to the incident microwave radiation. In one such composite structure as illustrated in FIG. 8, the organic composition to be further chemically treated is admixed with a particulate polymerization curing material and sandwiched between two layers 9a and 9c of microwave transparent material(s) to form layer 9b. Microwave irradiation 5 of the three-layer composite structure will selectively heat the middle layer of the composite 9b and initiate further rapid chemical reaction of the composition in that layer without affecting the material(s) comprising the top layer 9a and the bottom layer 9c of the composite. This also has application as a method of adhesively bonding two layers together using the microwave activated middle layer as an adhesive.

Polymerizable and/or Curable Compositions

The inventive method is generally applicable to polymerizable or curable compositions comprising monomers, oligomers, pre-polymers, and combinations thereof which can polymerize. For this invention, organic resins, systems, and components are preferred, although inorganic resins and components can also be used. In general, unsaturated resins are preferred which cure by addition reaction and without condensation reaction and co-production of a small-molecule by-product. Blends of resins can also be used.

Thermosetting resins and compositions, in general, are resins capable of being changed into a substantially infusible or insoluble product when cured by the application of heat. Upon polymerization and cure, the ability to flow is quickly lost in favor of stability. Polymerization and cure can result from reaction of various types of unsaturation including reaction of double and triple bonded compounds. Polymerization and cure can also result from various types of ring-opening polymerization.

More specifically, the thermoset resin can include ethylenic unsaturation, which can be polymerized by different mechanisms including radical, anionic, or cationic polymerization. Specific examples of suitable ethylenic unsaturation include acrylate, methacrylate, styrene, vinyl ether, vinyl ester, N-substituted acrylamide, N-vinyl amide, maleate esters, and fumarate esters.

Another suitable type of functionality is provided by, for example, epoxy groups, or thiol-ene or amine-ene systems. Epoxy groups can be polymerized through cationic polymerization, whereas the thiol-ene and amine-ene systems are usually polymerized through radical polymerization.

Curable or polymerizable resins and compositions can be formulated from, for example, reactive oligomers, reactive diluents, and additives as known in the art. Oligomers can be based on oligomeric backbones such as, for example, polyester, polyether, polycarbonate, and hydrocarbon. Oligomers can be, for example, so-called urethane acrylate oligomers which are generally prepared by reaction of hydroxylated oligomeric backbones, polyfunctional isocyanate compounds, and hydroxyl-functional acrylate end-capping compounds. Aromatic or aliphatic polyfunctional isocyanate compounds can be used.

Conventional thermosetting resins are generally discussed in, for example, Chapter 16 of F. Billmeyer's *Textbook of Polymer Chemistry* (3rd Ed.) 1984, which is hereby incorporated by reference. The thermosetting resin can be, for example, a phenolic resin, an amino resin, an unsaturated polyester resin, an epoxy resin, a polyurethane, a silicone polymer, an alkyd resin, an allyl resin, a furane resin, or an acrylate resin.

Phenolic resins include, for example, those based on reaction of phenol and formaldehyde. Amino resins include, for example, those based on reaction of melamine or urea with formaldehyde.

Unsaturated polyester resins include, for example, those prepared by copolymerization of unsaturated polyesters with unsaturated vinyl monomers like styrene. Fibrous fillers such as glass can be present. Unsaturated polyesters based on maleic anhydride or phthallic anhydride can be used. Suitable glycols include alkylene glycols such as propylene glycol.

Epoxy resins can be, for example, based on polyethers prepared from epichlorohydrin and bisphenol A (diphenylol propane). Other hydroxyl containing compounds which can be used include resorcinol, hydroquinone, glycols, and glycerol. The epoxy resin can be cured by, for example, polyamines, polyamides, polysulfides, urea- and phenol-formaldehyde, and acids or acid an hydrides.

Urethane resins can be, for example, prepared through reactions of polyisocyanates and glycols. Polyethers can be used including poly(1,4-butylene glycol) and sorbitol polyethers.

Silicone polymers can be, for example, based on alkyl siloxanes such as polydimethylsiloxane. Silicone curing can be carried out by free-radical cross-linking with, for example, benzoyl peroxide, by crosslinking of vinyl or allyl groups attached to silicon through reaction with silylhydride groups; or by crosslinking linear or slightly branched siloxane chains having reactive end groups such as silanols. Silicones can be reinforced with fillers such as silica.

Alkyd resins can be based on phthalic anhydride and glycerol. Other polyhydric alcohols commonly used include glycols, pentaerythritol, and sorbitol. Other components include maleic anhydride, isophthalic acid and anhydride, and terephthalic acid.

Allyl resins can be, for example, based on diallyl phthalate and diallyl isophthalate with cure by peroxide initiator. The ester diethylene glycol bisallyl carbonate can be used.

Furane resins can be used based on, for example, furfuraldehyde in combination with phenol. Alternatively, furfuraldehyde can be converted to furfuryl alcohol which can be thermoset by acids, or reacted with aldehydes or ketones.

In general, for the thermosetting resins of this invention, reactive crosslinking agents can be used, including, for example diamines, bisacetoacetates, and isocyanates. Other representative cross-linking systems include (some are already noted above): phenol-formaldehyde resins such as resoles and novolacs; unsaturated and alkyd polyesters cured through oxidative cross-linking mechanism; epoxy resins cured with amines, amine-terminated polyamides, amidoamides, acid catalysts, tertiary amine catalysts, carboxylic acids, anhydrides and phenols; isocyanates cured with active hydrogen functionalities such as multi-functional hydroxyls or amines; vinyl esters cured with free radical initiators; amino resins such as urea-formaldehyde or melamineformaldehyde cured with hydroxy functionalized resins in the presence of an acid; acrylics cured with various functional groups, including hydroxyl, glycidyl, carboxylic, isocyanate, oxazoline and aziridine; silicones cured with free radical initiators; and unsaturated hydrocarbons cured with sulfur or free radical initiators.

Reactive diluents can be monofunctional or polyfunctional. Mixtures of reactants with differing degrees of functionality can be used. The degree of functionality can help control the cross-linking in the final thermoset product. For example, monofunctional reactants can be used to minimize crosslinking, whereas di-, tri-, and tetra-functional reactants can be used to increase crosslinking.

Examples of curable or cross-linkable compounds include trimethylolpropane triacrylate, trimethylolpropane trimethacrylate, pentaerythritol triacrylate, pentaerythritol trimethacrylate, pentaerythritoltetraacrylate, pentaerythritoltetramethacrylate, trimethylolpropane propoxylate triacrylate, trimethylolpropane propoxylate trimethacrylate, trimethylolpropane ethoxylate triacrylate, trimethylolpropane ethoxylate trimethacrylate, glycerol propoxytriacrylate, glycerol propoxytrimethacrylate, dipentaerythritol monohydroxy pentaacrylate, dipentaerythritol monohydroxy pentamethacrylate, $C_6$–$C_{12}$ hydrocarbon diol diacrylates; $C_6$–$C_{12}$ hydrocarbon diol dimethacrylates, and combinations thereof.

A preferred example of a curable compound is trimethylolpropane triacrylate. The inventive method and the selection of parameters for the inventive process are exemplified below for this resin and the polymerization agent, t-butyl peroxybenzoate.

In an alternative embodiment of the inventive method, a monomer system is polymerized to yield a thermoplastic resin. In general, thermoplastic resins are compositions based on linear, uncrosslinked macromolecules which are soluble in solvent and capable of further processing in the melt. If desired, these thermoplastic resins can be crosslinked after exposure to microwave radiation and formation of thermoplastic resin. Thermoplastic resins are discussed in, for example, Billmeyer's *Textbook of Polymer Chemistry*, ($3^{rd}$ Ed.) Chapters 13–15, which are hereby incorporated by reference.

Typical examples of thermoplastic resins include polyolefins, polyethylene, polypropylene, polybutadiene, uncrosslinked rubbers and elastomers, polystyrene, acrylics, poly (vinyl esters) and derivatives thereof, halogen-containing polyers, polyamides, polyesters, polyethers, and cellulosic polymers.

Monofunctional acrylate and methacrylate monomers can also be used to form thermoplastic resins including, for example, monomers having an alkyl moiety comprising from 7 to 18 carbon atoms. Examples include stearyl acrylate, stearyl methacrylate, isooctyl acrylate, isooctyl methacrylate, lauryl acrylate, lauryl methacrylate, caprolactone acrylate, caprolactone methacrylate, decyl acrylate, decyl methacrylate, isodecyl acrylate, isodecyl methacrylate, isobornyl acrylate, isobornyl methacrylate, and combinations thereof.

Polymerization Agents

Preferred polymerization agents for the monomer, oligomer, polymer and combinations thereof of the invention include peroxy compounds such as, for example, tert-butyl peroxybenzoate. The polymerization agent operates to accelerate the polymerization or cure by interacting with both the carrier, which absorbs microwave radiation, and the polymerizable composition, which undergoes polymerization and/or crosslinking. Polymerization initiators and curing agents for different types of thermosetting and thermoplastic resins are well-known in the polymer chemistry arts. For addition polymerization cure of the resin, free-radical and ionic cure processes are possible, including cationic and anionic cure. However, a free-radical cure process with free-radical polymerization agents is preferred. Conventional polymerization agents and initiators are disclosed in the above-referenced Billmeyer text, which is hereby incorporated by reference.

For a free-radical cure, the polymerization agent can generate free radicals by thermal decomposition. Exemplary types of free radical polymerication initiators are well-known in the polymer chemistry arts and include, for example, organic peroxides, ketone peroxides, peroxyesters, peroxydicarbonates, peroxyketals, dialkyl peroxides, hydroperoxides, azo compounds, and diazo compounds. Specific non-limiting examples include benzoyl peroxide, methyl ethyl ketone peroxide (MEKP), dicumyl peroxide, azobisisobutyronitrile (AIBN), and tert-butyl peroxybenzoate. Other initiator types include (i) redox agents, including persulfates coupled with reducing agents and hydroperoxides coupled with ferrous ion, and (ii) organometallic reagents such as silver alkyls. Selection of polymerization initiators or curing agents can depend on the particular resin system. For example, polyester thermosets can be cured by benzoyl peroxide and MEKP. Also, for example, the temperature of the desired cure can effect selection of the polymerization initiator curing agent.

For the many cures which involve a mechanism other than addition polymerization curing, conventional curing or polymerization agents which accelerate or catalyze curing can be used such as, for example, acid or base curing or polymerization agents. The acids and bases include Lewis acids and bases as well as Bronstead acids and bases. One skilled in the art can select the particular curing or polymerization agent, and the concentration of the curing agent, for the particular curing system. For example, amino resins can be effectively cured in the presence of acid, and phenolic resins in the presence of an alkaline substance. Tertiary amines and organometallic tin catalysts encourage urethane linkage formation and can act as a polymerization agent.

A wide variety of curing systems can be used by modification of the polymerization agent. Mixtures of polymerization agents can be used including mixtures of high- and low-temperature polymerization agents. Selection of the polymerization agent can be effected by factors including, for example, 1) the type of process, 2) type and activity of resin, 3) working (gel) time required, 4) part thickness, 5) process area temperature, and 6) type and amount of fillers and additives.

Microwave Source and Irradiation Set-Up

Figure 9:
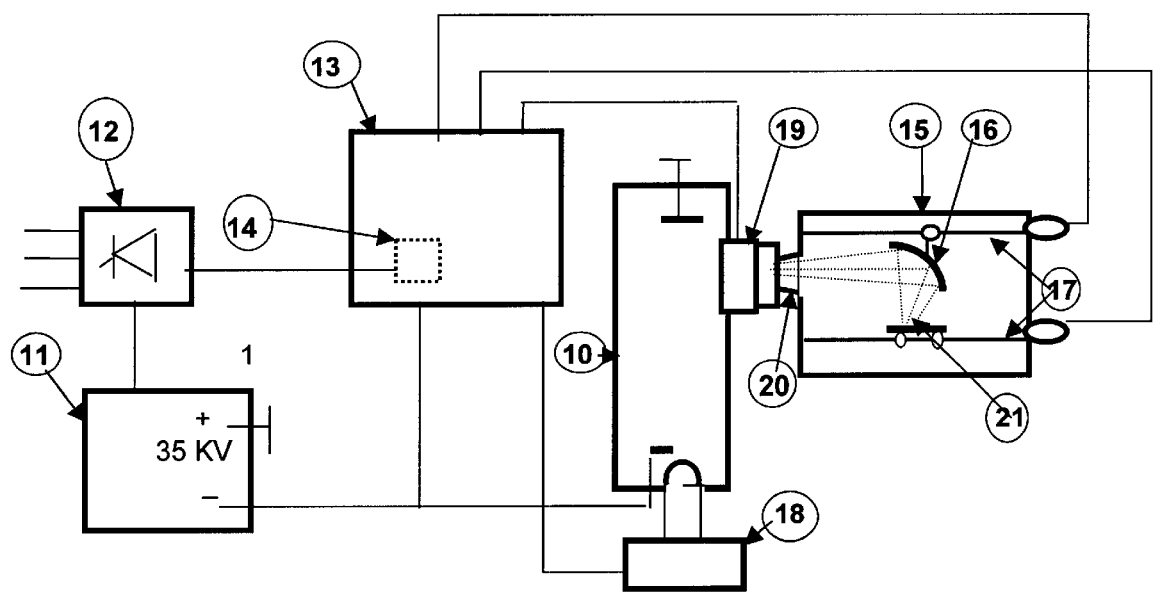
FIG. 9 illustrates as a block diagram the basic gyrotron beam installation used in the inventive method.

Microwave radiation with the necessary frequency and power density can be achieved using such generators as the gyrotron, klystron, and the like. In FIG. 9 an example of a microwave installation that can be used in the inventive method is illustrated.

The microwave unit consists of a gyrotron 10 which operates at a frequency of 82.9 GHz (wavelength $\lambda \approx 3.62$ mm), with a maximum output CW power of 40 kilowatts and power density of up to 20000 W/cm$^2$.

The gyrotron is connected to a power supply 11 at 240V/35 KV, I—up to 3A, power—up to 90 KW and a filament transformer 18 at 500 W (208V/25V).

The microwave beam passes through the waveguide 20 into the chamber 15 where it is directed with optical system 16 to the object being treated. The beam shape in the sample area 21 can be changed by adjusting the parameters of the optical system 16 (see for example, Lesurf, J. G. C. "Millimeter-wave optics, devices, and systems", *Theory Of Dielectric Optical Waveguides*, Dietrich Marchuse, 2$^{nd}$ edition, Academic Press, Boston, 1991;).

Microwave power is adjusted by the thyristor power regulator/switcher 12 and measured by calorimeter 19 which is installed in the gyrotron output window. The heating time is adjusted by the speed of motion systems 17 or by timer 14 and the thyristor power regulator/switcher 12. The timer accuracy is around 0.01 sec. Microwave power and all other parameters of the gyrotron are monitored by control panel 13. The microwave installation optionally includes the elements necessary to cool the sample area 21 or the sample prior to or during microwave irradiation. It is understood that the particular installation illustrated in FIG. 9 is optimally designed for research and development or demonstration testing of the inventive method. The person of ordinary skill in the art can easily modify the installation for manufacturing processes of various scales.

Using this setup, it is possible to perform curing and polymerization, monitoring of processing time and microwave power density.

Exemplary Determination of Process Parameters

The following examples are presented to provide a more detailed explanation of the present invention and of the preferred embodiments thereof and are intended as illustrations and not limitations.

EXAMPLE 1

Organic Processing with Particulate Polymerization Curing Material

Trimethylolpropane triacrylate ($H_2C$=$CHCO_2CH_2$)$_3CC_2H_5$) was chosen as the organic material (resin) for the curing experiment. Tert-Butyl peroxybenzoate ($C_6H_5CO_2OC(CH_3)_3$) was chosen as the curing agent. (i.e., polymerization agent). Activated carbon powder (G-60, −100 mesh) was chosen as the microwave absorbent carrier since it had been designed as an adsorbent for organic removal (see Selective Adsorption Associates, Inc. Product Data.) and it had a large specific material absorption (surface 900 m$^2$/g) for a particle size around 150 micron (−100 mesh).

a) Preliminary Calculations

All calculations made prior to and during the experiment were based on the following properties of the trimethylolpropane triacrylate resin, the tert-butyl peroxybenzoate curing agent and the activated carbon microwave absorbent carrier (See Handbook of Chemistry and Physics 80$^{th}$ edition, CRC Press LLC 1999; Catalog Handbook of Fine Chemicals 1998 Sigma-Aldrich Co; Selective Adsorption Associates, Inc. Product Data; BP Amoco Product Brochure; Handbook of Plastics, Elastomers and Composites, Charles A. Harper, Editor-in-chief, 3$^{rd}$ Edition, McGraw-Hill, 1996)

1. Resin degradation temperature $T_d$=180° C.
2. Optimal concentration of polymerization agent by weight, $\gamma$=0.75%
3. Resin curing enthalpy (heat of polymerization), $Q \approx 40$ kJ/mole
4. Resin heat capacity, $c_p \approx 400$ J/mole ° K.
5. Resin formula weight, $\mu$=296.32 g/mole
6. Resin density, $\rho_c$=1.021×10$^3$ kg/m$^3$
7. Resin thermal conductivity $\kappa$=0.14 W/m° K.
8. Carrier particle diameter d≈1.5×10$^{-4}$ m (radius a≈7.5×10$^{-5}$ m)
9. Carrier material density $\rho_a \approx 0.54$ g/cm$^3$
10. Electrical conductivity of carrier material $\sigma \approx 4 \times 10^4$ $\Omega^{-1}m^{-1}$
11. Initial resin temperature $T_0$=10° C.
12. The additional temperature increase ($\Delta T_Q$) arising from the curing heating process was calculated as: $\Delta T_Q$=Q/$C_p \approx 100°$ C.
13. The temperature conductivity of the resin, is estimated using the equation $$\eta = \kappa \mu / c_p \rho_c = 10^{-7} \text{ m}^2/\text{sec}.$$

b) Preparation of Polymer Composition

Preparation of the organic composition for microwave curing consisted of the following consecutive steps:

1. 1.0 g of the curing agent tert-Butyl peroxybenzoate ($C_6H_5CO_2OC(CH_3)_3$) was weighed with an electronic scale (EK-200 G) and put in a round quartz dish. The dish had an inner diameter of 10 cm, a wall height of 3 cm, and a wall thickness of 0.1 cm. Since quartz is a transparent material for microwave radiation and non-reactive to all components of the curable composition, this dish was used as an assay crucible for future curing.
2. The microwave absorbent carrier (activated carbon powder G-60, −100 mesh) was admixed gradually into the curing agent and stirred until all curing agent was completely absorbed by the carrier and a homogenous powdered mixture was formed. After that the total weight of used carrier powder $M_a$ used was determined by the scale to be 0.51 g by adding carrier until no further curing agent is visible and then noting the total weight to determine the added carrier weight.
3. A certain amount ($M_c$=133 g that was 99.25 weight % of the total organic material (i.e., resin and polymerization agent)) of trimethylolpropane triacrylate ($H_2C$=$CHCO_2CH_2)_3CC_2H_5$ was added to the particulate polymerization curing material (i.e., microwave absorbent carrier with polymerization agent applied thereon) and was stirred until the particulate polymerization curing material was spread evenly throughout the volume of the organic material.

These manipulations produced a flat layer (10 cm diameter and 1.7 cm high) of prepared composition in the quartz dish.

c) Determination of Microwave Parameters

The determination of the microwave parameters for chemically treating the organic composition consisted of the following consecutive steps:

1. The dispersion of carrier particles (n) for the obtained composition was calculated with the simple expression $n=(6/\pi d^3)(\rho_c/\rho_a)(M_a/M_c)$. The dispersion was found to be $n \approx 4.9 \times 10^9$ m$^{-3}$.
2. The maximal possible heating time was determined as $t_{max}=n^{-2/3}\eta^{-1}$ and was equal to $t_{max}$=3.5 sec.
3. The skin-layer ($\delta$) of the carrier material for the applied microwave frequency was calculated as $\delta=(4\pi f\mu_0\sigma)^{-1/2}$ and found to be $\approx 3 \times 10^{-6}$ m.
4. The microwave intensity that could be achieved at the sample area was estimated from the maximal microwave power (40 kW) of the generator used and the cross-section of the microwave beam at the same area. Optical system 16 (see FIG. 9) was set up for the microwave beam to have a round shape cross-section diameter of 10 cm (80 cm$^2$) at the sample area 21 to cover the entire sample being exposed. It was found that the intensity of the applied microwave radiation could come up to 500 W/cm$^2$.
5. An alignment chart (see Table 1-A,-B,-C) was created for the carrier $\Delta T_a$ and the resin $\Delta T_c$ temperatures increase from microwave heating during the different exposure times t lower than maximal exposure time $t_{max}$ and for the gyrotron frequency f=82.9 GHz (wavelength $\lambda \approx 3.62$ mm) and various microwave power densities I. The temperatures were calculated by using the equations described above: $\Delta T_a=9\pi(\delta/a)(It/\lambda)(C_a^*\rho_a^*)^{-1}$ and $\Delta T_c=(9\pi\gamma(\delta/a)+25\in")(It/\lambda)\mu/(C_p\rho_c)$
6. The total final resin temperature $T_{c(final)}=T_0+\Delta T_Q+\Delta T_c=10°$ C.+100° C.+$\Delta T_c$ was calculated (see fifth row in Table 1-A, -B, and -C).

TABLE 1-A

| t(sec) | 0.1 | 0.1 | 0.1 | 0.1 | 0.1 | 0.1 | 0.3 | 0.3 | 0.3 | 0.3 | 0.3 | 0.3 |
|---|---|---|---|---|---|---|---|---|---|---|---|---|
| I(W/cm$^2$) | 50 | 100 | 200 | 300 | 400 | 500 | 50 | 100 | 150 | 200 | 300 | 500 |
| $\Delta T_a$(° C.) | 17.5 | 35 | 70 | 105 | 140 | 175 | 52.5 | 105 | 157 | 210 | 315 | 525 |
| $\Delta T_c$(° C.) | 2.4 | 4.8 | 9.6 | 14.4 | 19.2 | 24 | 7.2 | 14.4 | 21.6 | 28.8 | 43.2 | 72 |
| $T_{c(final)}$ | 112 | 114 | 119 | 124 | 129 | 134 | 117 | 124 | 131 | 138 | 153 | 182 |
| $T_d - T_{c(final)}$ | 68 | 66 | 61 | 56 | 51 | 46 | 63 | 56 | 49 | 42 | 27 | −2 |

TABLE 1-B

| t(sec) | 0.5 | 0.5 | 0.5 | 0.5 | 0.5 | 0.5 | 1 | 1 | 1 | 1 | 1 | 1 |
|---|---|---|---|---|---|---|---|---|---|---|---|---|
| I(W/cm$^2$) | 10 | 20 | 50 | 100 | 200 | 300 | 10 | 20 | 50 | 100 | 150 | 200 |
| $\Delta T_a$(° C.) | 17.5 | 35 | 87.5 | 175 | 350 | 525 | 35 | 70 | 175 | 350 | 525 | 700 |
| $\Delta T_c$(° C.) | 2.4 | 4.8 | 12 | 24 | 48 | 72 | 4.8 | 9.6 | 24 | 48 | 72 | 96 |
| $T_{c(final)}$ | 112 | 115 | 122 | 134 | 158 | 182 | 115 | 120 | 134 | 158 | 182 | 206 |
| $T_d - T_{c(final)}$ | 68 | 65 | 58 | 46 | 22 | −2 | 65 | 60 | 46 | 22 | −2 | −26 |

TABLE 1-C

| t(sec) | 2 | 2 | 2 | 2 | 2 | 2 | 3 | 3 | 3 | 3 | 3 | 3 |
|---|---|---|---|---|---|---|---|---|---|---|---|---|
| I(W/cm$^2$) | 10 | 20 | 40 | 50 | 70 | 80 | 10 | 20 | 30 | 40 | 50 | 60 |
| $\Delta T_a$(° C.) | 70 | 140 | 280 | 350 | 490 | 560 | 105 | 210 | 315 | 420 | 525 | 630 |
| $\Delta T_c$(° C.) | 9.6 | 19.2 | 38.4 | 48 | 67.2 | 76.8 | 14.4 | 28.8 | 43.2 | 57.6 | 72 | 86.4 |
| $T_{c(final)}$ | 120 | 129 | 148 | 158 | 177 | 187 | 124 | 139 | 153 | 167 | 182 | 196 |
| $T_d - T_{c(final)}$ | 60 | 51 | 32 | 22 | 3 | −7 | 56 | 41 | 27 | 13 | −2 | −16 |

7. The possible power density and exposure times were selected from the alignment chart data. The criteria for selection is $T_d-T_{c(final)}$ should be positive values. According to the results of the calculations (see Table 1-A) if the microwave intensity is chosen to be 400–500 W/cm² (microwave power 32–40 kW) the carrier particles can be heated to 140° C.–175° C. in 0.1 sec with a final resin temperature lower than it's degradation temperature. At these values, the necessary polymerization agent temperature is achieved. In fact conducting momentary curing at the selected time ensures a productivity S around S=exposure area: exposure time=8 10⁻³ m²: 2.77 10⁻⁵ hour=288 m² (3100 Sq ft) per hour.

The foregoing example illustrates the type of calculations that may be performed by a person skilled in the art to provide an approximation of the proper choice of parameters for the rapid polymerization and/or curing of a particular monomer or polymer composition incorporating a given particulate polymerization curing material at a particular carrier dispersion and carrier size and irradiated with microwave energy of a given frequency, power density and exposure time without exceeding the decomposition temperature of the composition after it has been additionally heated by the heat generated by the chemical reaction. Alternatively, as described earlier, the appropriate parameters to assure that the decomposition temperature of the composition is not exceeded as discussed above can be selected empirically through experimentation by processing test samples of the particulate polymerization curing material by irradiation with microwave beam pulses with varying power density and assaying the appearance and properties of the resultant material. It is understood that a person of skill in the art will readily be able to vary these estimated parameters to optimize the inventive method for a particular polymer or monomer composittion and blends thereof.

d) Microwave Curing Experiments

The quartz dish with the polymer composition prepared according to the method described above was placed into the chamber in the sample area. Then the microwave generator set up as described above and in FIG. 9 was switched on for 0.1 seconds at a power of 40 KW (power density is 500 W/cm²). Then the treated sample was removed from the chamber. It was found that the polymer composition was solid and insoluble in acetone, ethanol, dimethylformamide and N-methylpyrrollidone. The material did not show a glass transition up to 300° C. (by differential scanning calorimetry or DSC) and the weight loss of the sample up to 300° C. was less than 3% (as measured by thermal gravimetric analysis or TGA), Another sample of the polymer composition was prepared using the same method as described above. This sample was also exposed to microwave irradiation under the same conditions as the first sample, except the exposure time was chosen to be 0.3 seconds at 500 W/cm² (which, based on the alignment chart, should produce an unacceptable processed sample, i.e., $T_d-T_{c(final)}<0$). Degradation (ignition and burning) of the resin under the microwave irradiation was observed, i.e., the sample was cracked and charred.

Another sample of the polymer composition was prepared using the same method as described above, except no carrier was added. This sample was also exposed to microwave irradiation under the same conditions as the first sample. No transformation to the solid state was observed; therefore, no curing occurred.

EXAMPLE 2

Organis Processing with an Encapsulated Polymerization Agent

A solution of unsaturated polyester resin (obtained from Ashland Chemicals) in styrene was chosen as the organic material for the curing experiment. Perkadox 16 as a powder was chosen as the curing agent (i.e. polymerization agent). SIC powder (green –30 mesh) was chosen as the microwave absorbent carrier. Powdered polyvinyl alcohol was chosen as the encapsulating material.

a) Preliminary Calculations

All calculations made prior to and during the experiment were based on the following properties of the organic material, the curing agent, the microwave absorbent carrier and the encapsulating material: (See Handbook of Chemistry and Physics 80th edition, CRC Press LLC 1999; Catalog Handbook of Fine Chemicals 1998 Sigma-Aldrich Co; Handbook of Plastics, Elastomers, and Composites/Charles A. Harper, editor-in-chief—3rd ed. McGraw Hill 1996)

1. Resin degradation temperature $T_d$=180° C.
2. Optimal polymerization agent concentration by weight, $\gamma$=0.7%
3. Resin curing enthalpy, Q≈50 kJ/mole
4. Resin heat capacity, $c_p$≈400 J/mole ° K.
5. Resin formula weight, $\mu$=420 g/mole
6. Resin density, $\rho_c$=1.12×10³ kg/m³
7. Polymerization agent density, $\rho_{ca}$=1.334×10³ kg/m³
8. Encapsulating material density, $\rho_{cm}$=1.3×10³ kg/m³
9. Resin thermal conductivity $\kappa$=0.56 W/m° K.
10. Carrier particle diameter d≈6×10⁻⁴ m (a≈3×10⁻⁴ m)
11. Carrier material density $\rho_a$≈3.22 g/cm³
12. Electrical conductivity of carrier material $\sigma$≈10³ $\Omega^{-1}m^{-1}$
13. Initial resin temperature $T_0$=10° C.
14. The additional temperature increase ($\Delta TQ$) arising from the curing heating process was calculated as: $\Delta T_Q$=Q/$c_p$≈120° C.
15. The temperature conductivity of the resin, is estimated using the equation $\eta$=$\kappa\mu/c_p\rho_c$=9×10⁻⁷ m²/sec.

e) Preparation of Polymer Composition

The preparation of polymer composition for microwave curing consisted of the following consecutive steps:

1. Calculation of the amount of encapsulating material ($m_{em}$) and the amount of carrier ($m_a$) that is necessary to apply $m_{ca}$=1 g of polymerization agent (curing agent).

To cover each particle of carrier material by a layer one tenth of its radius with curing agent the amount of carrier was calculated as $m_a$=$m_{ca}(\rho_a/0.3\rho_{ca})$. That is $m_a$=8 g.

To cover each particle of carrier (with applied curing agent) by a layer one tenth of its radius with encapsulating material the amount of encapsulating material was calculated as $m_{em}$=$m_a(0.3 \rho cm/\rho_a)$. That is $m_{cm}$=1 g.

2. Encapsulating material (1 g) was measured out with an electronic scale (EK-200G) and put in a glass dish.

3. A sufficient amount of water was gradually added to the glass dish and stirred with the encapsulating material until it was entirely dissolved. This produced an aqueous solution of the encapsulating material (polyvinyl alcohol) in water.

4. Curing agent (1.0 g) was admixed and stirred into the solution to produce a colloidal suspension of the curing agent powder in the solution.

5. Carrier material powder ($M_a$=8 g) was gradually admixed and stirred into the colloidal suspension until a new homogenous suspension was obtained in the glass dish.

6. The obtained suspension was removed from the dish and placed on a clean glass surface as a plain layer and let dry. After the suspension was completely dried, the powder of the particulate polymerization curing material was formed. Each particle of the powder appeared by microscopic examination to consist of a core of microwave absorbent carrier with curing agent material applied to the core. Moreover, each particle was encapsulated by the polyvinyl alcohol encapsulating material that coated the curing agent to prevent its premature release into the curable organic material.

7. All particulate polymerization curing material was placed in a round quartz dish and a certain amount ($M_c$=143 g that was 99.3 weight % of the total organic composition, (i.e. resin and polymerization agent)) of resin was added to the quartz dish and was carefully stirred until the polymerization curing material spread evenly throughout the volume of the resin. The quartz dish had an inner diameter of 10 cm, a wall height of 3 cm, and a wall thickness 0.1 cm. Since quartz is a transparent material for microwave radiation and non-reactive to all components of the curable composition, this dish was used as an assay crucible for future curing.

These manipulations produced a flat layer (10 cm diameter and 1.8 cm high) of prepared composition in the quartz dish.

c) Determination of Microwave Parameters

4. The microwave intensity that could be achieved at the sample area was estimated from the maximal microwave power (40 kW) of the generator used and the cross-section of the microwave beam at the sample area. Optical system 16 (see FIG. 9) was set up for the microwave beam to have a round shape cross-section diameter of 10 cm (80 cm$^2$) at the sample area 21 to cover the entire sample being exposed. It was found that the intensity of the applied microwave radiation could come up to 500 W/cm$^2$.

5. An alignment chart (see Table 2-A,-B,-c) was created for the carrier $T_a$ and the resin $T_c$ temperatures achieved from microwave heating during the different exposure times t lower than maximal exposure time $t_{max}$ and for the gyrotron frequency f=82.9 GHz (wavelength $\lambda \approx 3.62$ mm) and various microwave power densities I. The temperatures were calculated by using the equations described above: $\Delta T_a = T_a - T_0 = 9\pi(\delta/a)(It/\lambda)(C_a^* \rho_a^*)^{-1}$ and $\Delta T_c = T_c - T_0 = (9\pi\gamma(\delta/a) + 25\in")(It/\lambda)\mu/(C_p\rho_c)$.

TABLE 2-A

| t(sec) | 0.1 | 0.1 | 0.1 | 0.1 | 0.1 | 0.1 | 0.15 | 0.15 | 0.15 | 0.15 | 0.15 | 0.15 |
|---|---|---|---|---|---|---|---|---|---|---|---|---|
| I(W/cm$^2$) | 50 | 100 | 200 | 300 | 400 | 500 | 50 | 100 | 200 | 300 | 400 | 500 |
| $\Delta T_a$(° C.) | 27 | 43 | 76 | 109 | 142 | 175 | 35 | 60 | 109 | 159 | 208 | 258 |
| $\Delta T_c$(° C.) | 4 | 7 | 14 | 22 | 29 | 36 | 5 | 11 | 22 | 32 | 43 | 54 |
| $T_{c(final)}$ | 134 | 137 | 144 | 152 | 159 | 166 | 135 | 141 | 152 | 162 | 173 | 184 |
| $T_d - T_{c(final)}$ | 46 | 43 | 36 | 28 | 21 | 14 | 45 | 39 | 28 | 18 | 7 | −4 |

TABLE 2-B

| t(sec) | 0.5 | 0.5 | 0.5 | 0.5 | 0.5 | 0.5 | 1 | 1 | 1 | 1 | 1 | 1 |
|---|---|---|---|---|---|---|---|---|---|---|---|---|
| I(W/cm$^2$) | 50 | 70 | 100 | 130 | 150 | 200 | 30 | 40 | 50 | 60 | 80 | 100 |
| $\Delta T_a$(° C.) | 93 | 126 | 175 | 225 | 258 | 340 | 109 | 142 | 175 | 208 | 274 | 340 |
| $\Delta T_c$(° C.) | 18 | 25 | 36 | 47 | 54 | 72 | 22 | 29 | 36 | 43 | 58 | 72 |
| $T_c$(final) | 148 | 155 | 166 | 177 | 184 | 202 | 152 | 159 | 166 | 173 | 188 | 202 |
| $T_d - T_{c(final)}$ | 32 | 25 | 14 | 3 | −4 | −22 | 28 | 21 | 14 | 7 | −8 | −22 |

TABLE 2-C

| t(sec) | 2 | 2 | 2 | 2 | 2 | 2 | 4 | 4 | 4 | 4 | 4 | 4 |
|---|---|---|---|---|---|---|---|---|---|---|---|---|
| I(W/cm$^2$) | 5 | 10 | 20 | 30 | 40 | 60 | 5 | 10 | 15 | 20 | 30 | 40 |
| $\Delta T_a$(° C.) | 43 | 76 | 142 | 208 | 274 | 406 | 76 | 142 | 208 | 274 | 406 | 538 |
| $\Delta T_c$(° C.) | 7 | 14 | 29 | 43 | 58 | 86 | 14 | 29 | 43 | 58 | 86 | 115 |
| $T_c$(final) | 137 | 144 | 159 | 173 | 188 | 216 | 144 | 159 | 173 | 188 | 216 | 245 |
| $T_d - T_{c(final)}$ | 43 | 36 | 21 | 7 | −8 | −36 | 36 | 21 | 7 | −8 | −36 | −66 |

Note:
$T_{c(final)} = T_0 + \Delta T_Q + \Delta T_c = 10°$ C. $+ 120°$ C. $+ \Delta T_c$ The determination of microwave parameters for chemically treating the organic composition consisted of the following consecutive steps:

1. The dispersion of carrier particles (n) for the obtained composition was calculated with the simple expression $n=(6/\pi d^3)(\rho_c/\rho_a)(M_a/M_c)$. The dispersion was found to be n≈0.2×10$^9$ m$^{-3}$.

2. The maximal possible heating time was determined as $t_{max}=n^{-2/3}\eta^{-1}$ and was equal to $t_{max}$=5 sec.

3. The skin-layer ($\delta$) of the carrier material for the applied microwave frequency was calculated as $\delta=(4\pi f\mu_0 \sigma)^{-1/2}$ and found to be ≈3×10$^{-5}$ m.

6. The possible power density and exposure times were selected from the alignment chart data. The criteria for selection is $T_d-T_{c(final)}>0$ (i.e the value should be positive). In addition the value of $T_a$ should be greater than 200° C.(the melting point of encapsulating material). According to the results of the calculations (see Table 2-A) if the microwave intensity is chosen to be 400–500 W/cm$^2$ (microwave power 32–40 kW the carrier particles can be heated up to 200° C.–250° C. in 0.15 sec with a final resin temperature lower than it's degradation temperature. At these values, the necessary polymerization agent temperature is achieved. In fact, conducting momentary curing at the selected time ensures a productivity S around S=exposure area: exposure time=8 $10^{-3}$ m$^2$/4.16 $10^{-5}$ hour=192 m$^2$ (2100 Sq ft) per hour.

d) Microwave Curing Experiments

The quartz dish with the polymer composition prepared according to the method described above was placed into the chamber in the sample area. Then microwave generator set up as described above and in FIG. 9 was switched on for 0.15 seconds at a power of 40 kW (power density is 500 W/cm$^2$). Then the treated sample was removed from the chamber. It was found that the polymer composition was solid and insoluble in acetone, ethanol and dimethylformamide. The material did not show a glass transition up to 200° C. (by differential scanning calorimetry or DSC) and the weight loss of the sample up to 200° C. was less than 2% (as measured by thermal gravimetric analysis or TGA), Another sample of the polymer composition was prepared using the same method of preparation as described above. This sample was also exposed to microwave at the same conditions as the first one, except the microwave intensity was chosen to be 0.5 seconds at 200 W/cm$^2$ (which, based on the alignment chart, should produce an unacceptable processed sample, i.e., $T_{mb}-T_{cfin}<0$). Degradation (ignition and burning) of the resin under the microwave irradiation was observed, i.e., the sample was cracked and charred.

Another sample of the polymer composition was prepared using the same method of preparation as described above, except no carrier and no encapsulating material was added. This sample was also exposed by microwave irradiation under the same conditions as the first sample. No transformation to the solid state was observed; therefore, no curing occurred.

What is claimed is:

1. A method of treating an organic composition comprising at least one polymer to effect further and rapid chemical reaction of the composition comprising dispersing within said composition an effective amount of a particulate polymerization curing material comprising a polymerization agent applied on a microwave absorbent carrier, said carrier having a greater microwave absorption than the composition at a selected microwave irradiation frequency, and exposing the resultant mixture to microwave radiation of an effective power density and a time less than about $n^{-2/3}\eta^{-1}$ but sufficient to achieve the activation temperature of the polymerization agent and wherein the selected power density and exposure time are sufficient to ensure that the polymerization agent is heated to a temperature higher than the composition temperature such that the difference in said temperatures is large enough to prevent the temperature of the composition from exceeding its decomposition temperature after the composition has been additionally heated by the heat generated by the chemical reaction.

2. A method as in claim 1 wherein the further chemical reaction is curing and the polymerization agent is a curing agent.

3. A method as in claim 2 wherein the microwave irradiation frequency is between about 10 GHz to about 1000 GHz.

4. A method as in claim 1 wherein the mixture is cooled prior to or during microwave irradiation.

5. A method as in claim 1 wherein an encapsulating material which is insoluble in the composition until a temperature at or about the activation temperature of the polymerization agent encapsulates the polymerization agent.

6. A method of treating an organic composition comprising at least one monomer to effect further and rapid chemical reaction of the composition comprising dispersing within said composition an effective amount of a particulate polymerization curing material comprising a polymerization agent applied on a microwave absorbent carrier, said carrier having a greater microwave absorption than the composition at a selected microwave irradiation frequency, and exposing the resultant mixture to microwave radiation of an effective power density and a time less than about $n^{-2/3}\eta^{-1}$ but sufficient to achieve the activation temperature of the polymerization agent and wherein the selected power density and exposure time are sufficient to ensure that the polymerization agent is heated to a temperature higher than the composition temperature such that the difference in said temperatures is large enough to prevent the temperature of the composition from exceeding its decomposition temperature after the composition has been additionally heated by the heat generated by the chemical reaction.

7. A method as in claim 6 wherein the further chemical reaction is polymerization.

8. A method as in claim 7 wherein the microwave irradiation frequency is between about 10 GHz to about 1000 GHz.

9. A method as in claim 6 wherein the mixture is cooled prior to or during microwave irradiation.

10. A method as in claim 6 wherein an encapsulating material which is insoluble in the composition until a temperature at or about the activation temperature of the polymerization agent encapsulates the polymerization agent.

11. A method of treating an organic composition comprising at least one polymer to effect further and rapid chemical reaction of the composition comprising dispersing within said composition an effective amount of a particulate polymerization curing material comprising a microwave absorbent carrier distributed within a filler, the said filler containing a polymerization agent applied to its external surface, said carrier having a greater microwave absorption than the composition at a selected microwave irradiation frequency, and exposing the resultant mixture to microwave radiation of an effective power density and a time less than about $n^{-2/3}\eta^{-1}$ but sufficient to achieve the activation temperature of the polymerization agent and wherein the selected power density and exposure time are sufficient to ensure that the polymerization agent is heated to a temperature higher than the composition temperature such that the difference in said temperatures is large enough to prevent the temperature of the composition from exceeding its decomposition temperature after the composition has been additionally heated by the heat generated by the chemical reaction.

12. A method as in claim 11 wherein the further chemical reaction is curing and the polymerization agent is a curing agent.

13. A method as in claim 12 wherein the microwave irradiation frequency is between about 10 GHz to about 1000 GHz.

14. A method as in claim 11 wherein the mixture is cooled prior to or during microwave irradiation.

15. A method as in claim 11 wherein an encapsulating material which is insoluble in the composition until a temperature at or about the activation temperature of the polymerization agent encapsulates the polymerization agent.

16. A particulate polymerization curing material capable, when mixed into an organic composition at an effective amount and exposed to an appropriate frequency of microwave radiation at an effective power density and exposure time, of effecting rapid and further chemical reaction of said composition, without exceeding the decomposition temperature of the composition, said particulate material comprising a polymerization agent applied on a microwave absorbent carrier of an effective size and dispersion.

17. A particulate polymerization curing material as in claim 16 wherein the particulate polymerization curing material is capable of curing an organic composition comprised of an at least partially uncured polymer composition comprising at least one polymer.

18. A particulate polymerization curing material as in claim 16 wherein the particulate polymerization curing material is capable of polymerizing an organic composition comprising at least one monomer.

19. A particulate polymerization curing material as in claim 16 wherein the particulate polymerization curing material is capable of polymerizing an organic composition comprising at least one multifunctional monomer.

20. A particulate polymerization curing material as in claim 16 wherein the microwave absorbent carrier is capable of absorbing a greater amount of microwave radiation between a frequency from about 10 GHz to about 1000 GHz than the composition in which it is dispersed.

21. A particulate polymerization curing material as in claim 16 wherein the microwave absorbent carrier is selected from the group consisting of semi-metals, carbides, nitrides, oxides, sulfides, silicides, boron, graphite and metals.

22. A particulate polymerization curing material as in claim 16 wherein an encapsulating material which is insoluble in the composition until a temperature at or about the activation temperature of the polymerization agent encapsulates the polymerization agent.

23. A particulate polymerization curing material incorporating a filler which is capable, when mixed into an organic composition at an effective amount and exposed to an appropriate frequency of microwave radiation at an effective power density and exposure time, of effecting rapid and further chemical reaction of said composition, without exceeding the decomposition temperature of the composition, said particulate polymerization curing material comprising a microwave absorbent carrier of an effective size and dispersion distributed within a filler and the said filler having a polymerization agent applied on its external surface.

24. A particulate polymerization curing material incorporating a filler as in claim 23 wherein the particulate polymerization curing material is capable of curing an organic composition comprised of an at least partially uncured polymer composition comprising at least one polymer.

25. A particulate polymerization curing material incorporating a filler as in claim 23 wherein the particulate polymerization curing material is capable of polymerizing an organic composition comprising at least one monomer.

26. A particulate polymerization curing material incorporating a filler as in claim 23 wherein the particulate polymerization curing material is capable of polymerizing an organic composition comprising at least one multifunctional monomer.

27. A particulate polymerization curing material incorporating a filler as in claim 23 wherein the microwave absorbent carrier is capable of absorbing a greater amount of microwave radiation between a frequency from about 10 GHz to about 1000 GHz than the composition in which it is dispersed.

28. A particulate polymerization curing material incorporating a filler as in claim 23 wherein the microwave absorbent carrier is selected from the group consisting of semi-metals, carbides, nitrides, oxides, sulfides, silicides, boron, graphite and metals.

29. A particulate polymerization curing material incorporating a filler as in claim 23 wherein an encapsulating material which is insoluble in the organic composition until a temperature at or about the activation temperature of the polymerization agent encapsulates the polymerization agent.

* * * * *